Aug. 17, 1926.                                         1,596,105
              B. F. KELLY
            MIRROR OR THE LIKE
            Filed June 22, 1923
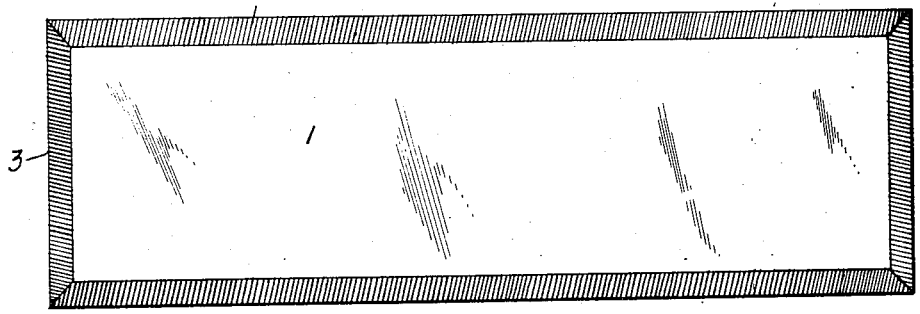
FIG. 1.
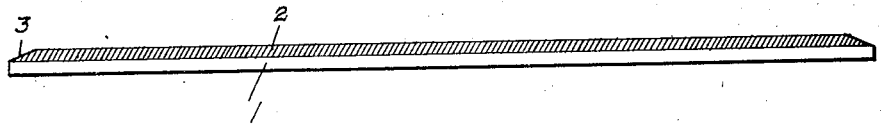
FIG. 2.
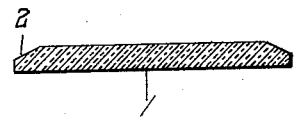
FIG. 3.
FIG. 4.
                               INVENTOR.
                    BERT F. KELLY
              BY
                    Carey S. Frye
                        ATTORNEY.

Patented Aug. 17, 1926.

1,596,105

UNITED STATES PATENT OFFICE.

BERT F. KELLY, OF INDIANAPOLIS, INDIANA, ASSIGNOR OF ONE-HALF TO ROBERT F. MILLER, OF INDIANAPOLIS, INDIANA.

MIRROR OR THE LIKE.

Application filed June 22, 1923. Serial No. 647,155.

This invention relates to mirrors, glass panels, or the like to be used for various or any preferred purpose, the mirrors being primarily used with automobiles or similar vehicles for obtaining a view of objects in the rear of the vehicle, while the glass panel is designed primarily for use in connection with doors or other movable object for protecting the surface of the door incident to the contact of the hand therewith in moving the door to open or closed position.

The salient feature of the invention is in so treating the surface or surfaces of the section of glass that a substantially translucent border will be formed at suitable points on the surface of the glass, thereby obviating the necessity of providing a frame for the glass and at the same time making that portion of the glass within the border stand out prominently and render the glass more attractive in appearance.

The border is preferably arranged around the edges of the section of glass and the edges containing the border are preferably tapered or beveled and these beveled edges may be formed by grinding, so as to produce demarcations or ribs to give a frame-like appearance.

Other objects and advantages will be hereinafter more fully set forth and pointed out in the accompanying specification.

In the accompanying drawing which is made a part of this application,

Figure 1 is a plan view of the mirror or glass section.

Figure 2 is an edge elevation thereof.

Figure 3 is a transverse sectional view therethrough, and

Fig. 4 is a section taken through the border of the glass transversely to the ribs formed therein.

Referring to the drawings, 1 indicates a section of glass, in this instance a mirror and shown as oblong and having its side and end edges 2 and 3 beveled.

The process prevalent heretofore in constructing devices of this class is to first bevel and finish the edges and in the event of a mirror, the reflecting medium is applied after the beveling operation has been completed, thereby entailing considerable expense in manufacture. In addition the excess cost of the device, the beveled portions will cast a reflection and owing to the angle of the beveled portions, a distorted and confusing reflection of the image is given in the event the focus of vision is near the edge of the glass.

By leaving the surfaces treated in an unfinished or unpolished condition such surfaces will have a substantially stippled effect and be rendered substantially translucent and the color effect will be of sufficient difference from the remainder of the surface of the glass as to give a defined border effect to the glass and at the same time so reduce the cost of production that the glass may be produced at a minimum expense.

The surface of the glass may be treated in any preferred manner for producing the border effect or for beveling the edges of the glass, but the surfaces are preferably treated by a grinding operation or by the well known sand blast process, the demarcations of the grinding tool or the demarcations of the sand, giving the proper stippling effect to the treated surface.

This manner of producing and treating the glass not only greatly reduces the cost of production, but the necessity of a metal or other form of frame for the glass is dispensed with, as the stippled or unfinished portions will have the same appearance as that of a frame.

The demarcations shown in the drawing are such as are formed by grinding and are at substantially the same angle as the angle of travel of that portion of the grinding implement engaging the glass is to the section of the glass. The demarcations at the glass edges are preferably formed by a grinding process, the grinding tool or instrument operating at substantially right angles to the adjacent edge of the glass, whereby to provide fine ribbing on the glass surface thus treated. The ribs are parallel to each other and are disposed at substantially right angles to the glass edge. The ribs thus forming the demarcations are extremely fine and close together, and produce a highly artistic contrasting border for the mirror, in addition to diffusing or absorbing any light rays that may strike the surface so treated.

What I claim is:—

1. A section of glass having beveled edges and a plurality of ribs formed therein extending transversely of the respective beveled edges, forming in effect a framelike border.

2. A section of glass having beveled portions, and angularly extending ribs formed in said beveled portions for rendering them substantially translucent and imparting to said section of glass the appearance of having a framelike border.

In testimony whereof I hereto affix my signature.

BERT F. KELLY.